United States Patent
Gester et al.

(10) Patent No.: US 11,597,112 B2
(45) Date of Patent: Mar. 7, 2023

(54) POLYMERIC CUTTING EDGE STRUCTURES AND METHOD OF MANUFACTURING POLYMERIC CUTTING EDGE STRUCTURES

(71) Applicant: The Gillette Company LLC, Boston, MA (US)

(72) Inventors: Matthias Gester, Farnborough (GB); Roman Kiyan, Hannover (DE); Ulf Hinze, Garbsen (DE); Kestutis Kurselis, Garbsen (DE)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 17/336,923

(22) Filed: Jun. 2, 2021

(65) Prior Publication Data
US 2021/0283793 A1     Sep. 16, 2021

Related U.S. Application Data

(62) Division of application No. 15/188,100, filed on Jun. 21, 2016, now Pat. No. 11,059,194.
(Continued)

(51) Int. Cl.
*B26B 21/60* (2006.01)
*B29C 37/00* (2006.01)
(Continued)

(52) U.S. Cl.
CPC .......... *B26B 21/60* (2013.01); *B26B 21/4068* (2013.01); *B26B 21/58* (2013.01);
(Continued)

(58) Field of Classification Search
CPC . B26B 21/60; B26B 21/4068; B29C 33/3842; B29C 33/448; B29C 33/52; B29C 35/0805; B29C 37/0028; B29C 39/02; B29C 39/026; B29C 39/028; B29C 39/021; B29C 39/10; B29C 2035/0827;
(Continued)

(56) References Cited

U.S. PATENT DOCUMENTS 3,035,344 A    5/1962  Brown
4,041,476 A    8/1977  Swainson
(Continued)

FOREIGN PATENT DOCUMENTS

CN    103011058 B    3/2015
CN    204451225 U    7/2015
(Continued)

OTHER PUBLICATIONS

13917M PCT Search Report and Written Opinion for PCT/US2016/038514 dated Oct. 14, 2016.
(Continued)

*Primary Examiner* — Omar Flores Sanchez
(74) *Attorney, Agent, or Firm* — Joanne N. Pappas; Kevin C. Johnson

(57) ABSTRACT

A functional polymeric cutting edge structure and methods for manufacturing cutting edge structures using polymeric materials are provided. A razor blade for use in a razor cartridge or a blade box for assembly in a razor cartridge frame may be formed using the present invention.

25 Claims, 7 Drawing Sheets

Related U.S. Application Data

(60) Provisional application No. 62/186,729, filed on Jun. 30, 2015.

(51) Int. Cl.

| | | |
|---|---|---|
| B29C 35/08 | (2006.01) | |
| B29C 33/38 | (2006.01) | |
| B26B 21/58 | (2006.01) | |
| B29C 39/00 | (2006.01) | |
| B29C 33/00 | (2006.01) | |
| B29C 33/40 | (2006.01) | |
| B26B 21/40 | (2006.01) | |
| B29C 39/02 | (2006.01) | |
| B29C 39/10 | (2006.01) | |
| B29L 31/00 | (2006.01) | |
| B29C 39/26 | (2006.01) | |
| B29K 105/00 | (2006.01) | |
| B29C 33/44 | (2006.01) | |
| B29C 33/52 | (2006.01) | |
| B29K 33/04 | (2006.01) | |
| B29K 105/24 | (2006.01) | |

(52) U.S. Cl.
CPC ........ B29C 33/005 (2013.01); B29C 33/3842 (2013.01); B29C 33/3857 (2013.01); B29C 33/40 (2013.01); B29C 35/0805 (2013.01); B29C 35/0888 (2013.01); B29C 37/0028 (2013.01); B29C 39/006 (2013.01); B29C 39/02 (2013.01); B29C 39/026 (2013.01); B29C 39/028 (2013.01); B29C 33/448 (2013.01); B29C 33/52 (2013.01); B29C 39/021 (2013.01); B29C 39/10 (2013.01); B29C 39/26 (2013.01); B29C 2035/0827 (2013.01); B29C 2035/0833 (2013.01); B29C 2037/0035 (2013.01); B29K 2033/04 (2013.01); B29K 2105/0002 (2013.01); B29K 2105/0005 (2013.01); B29K 2105/0058 (2013.01); B29K 2105/0094 (2013.01); B29K 2105/24 (2013.01); B29K 2833/12 (2013.01); B29K 2883/00 (2013.01); B29K 2995/0027 (2013.01); B29L 2031/7186 (2013.01); B29L 2031/72 (2013.01); B29L 2031/756 (2013.01)

(58) Field of Classification Search
CPC ........ B29C 2037/0035; B29K 2033/04; B29K 2105/0002; B29K 2105/0005; B29K 2105/0058; B29K 2105/0094; B29K 2105/24; B29K 2833/12; B29K 2883/00; B29L 2031/7186; B29L 2031/72
See application file for complete search history.

(56) References Cited

U.S. PATENT DOCUMENTS

| | | |
|---|---|---|
| 4,575,330 A | 3/1986 | Hull |
| 5,426,851 A | 6/1995 | Gilder et al. |
| 5,782,852 A | 7/1998 | Foggia et al. |
| 5,876,550 A | 3/1999 | Feygin et al. |
| 6,044,566 A | 4/2000 | Ries et al. |
| 6,117,612 A | 9/2000 | Halloran et al. |
| 6,133,336 A | 10/2000 | Popat et al. |
| 6,364,986 B1 | 4/2002 | Kieronski |
| 6,379,324 B1 | 4/2002 | Gartstein et al. |
| 6,439,874 B1 | 8/2002 | Buzzeo et al. |
| 6,441,338 B1 | 8/2002 | Rabinovich |
| 6,671,961 B1 | 1/2004 | Santhagens et al. |
| 6,713,772 B2 | 3/2004 | Goodman et al. |
| 7,778,723 B2 | 8/2010 | Cregger |
| 8,327,546 B2 | 12/2012 | Tucker et al. |
| 8,530,118 B2 | 9/2013 | Devoe et al. |
| 8,642,122 B2 | 2/2014 | Wang et al. |
| 8,858,807 B2 | 10/2014 | Devoe et al. |
| 8,889,050 B2 | 11/2014 | Nitsch |
| 9,199,384 B2 | 12/2015 | Gringer et al. |
| 9,211,480 B2 | 12/2015 | Lu |
| 9,227,331 B2 | 1/2016 | Zhuk et al. |
| 9,463,395 B2 | 10/2016 | Lu |
| 10,518,429 B2 | 12/2019 | Gester et al. |
| 10,562,200 B2 | 2/2020 | Gester et al. |
| 11,059,194 B2 | 7/2021 | Gester et al. |
| 2004/0187644 A1 | 9/2004 | Peterlin et al. |
| 2005/0126016 A1 | 6/2005 | Branden |
| 2006/0196054 A1 | 9/2006 | Luxton |
| 2007/0101574 A1 | 5/2007 | Royle et al. |
| 2007/0191761 A1 | 8/2007 | Boone et al. |
| 2008/0086888 A1 | 4/2008 | Scheinfeld |
| 2009/0038166 A1 | 2/2009 | Crichton et al. |
| 2009/0099537 A1 | 4/2009 | Devoe et al. |
| 2009/0211690 A1 | 8/2009 | Bartholomeusz et al. |
| 2009/0218196 A1 | 9/2009 | Groenvall et al. |
| 2009/0320299 A1 | 12/2009 | Kuhn et al. |
| 2010/0011911 A1 | 1/2010 | Aalto et al. |
| 2010/0021647 A1 | 1/2010 | Sitti et al. |
| 2010/0178493 A1 | 7/2010 | Wang et al. |
| 2010/0267781 A1 | 11/2010 | Skrobis |
| 2010/0276829 A1 | 11/2010 | Yang et al. |
| 2010/0278480 A1 | 11/2010 | Vasylyev |
| 2010/0319204 A1 | 12/2010 | Peterson et al. |
| 2011/0033887 A1 | 2/2011 | Fang et al. |
| 2011/0042847 A1* | 2/2011 | Ogawa ................ B29C 33/42 264/219 |
| 2011/0127690 A1 | 6/2011 | Honda et al. |
| 2011/0208256 A1 | 8/2011 | Zuhars |
| 2012/0000074 A1 | 1/2012 | Pazosschroeder |
| 2012/0060379 A1 | 3/2012 | Culf |
| 2012/0330449 A1 | 12/2012 | Edwards et al. |
| 2013/0008036 A1 | 1/2013 | Gringer et al. |
| 2013/0012612 A1 | 1/2013 | Houbertz-krauss et al. |
| 2013/0014395 A1 | 1/2013 | Patel et al. |
| 2013/0087942 A1 | 4/2013 | Kimishima |
| 2013/0315530 A1 | 11/2013 | La Porta et al. |
| 2014/0033538 A1 | 2/2014 | Peterson et al. |
| 2014/0066843 A1 | 3/2014 | Zhang et al. |
| 2014/0360021 A1 | 12/2014 | Sonnenberg et al. |
| 2015/0030642 A1 | 1/2015 | Wu et al. |
| 2015/0166394 A1 | 6/2015 | Marjanovic et al. |
| 2015/0328789 A1 | 11/2015 | Skrobis et al. |
| 2016/0067922 A1 | 3/2016 | Voris et al. |
| 2016/0114530 A1 | 4/2016 | Thiel et al. |
| 2016/0167241 A1 | 6/2016 | Goldfarb et al. |
| 2017/0061324 A1 | 1/2017 | Gester et al. |
| 2017/0368703 A1 | 12/2017 | Gester et al. |
| 2017/0368704 A1 | 12/2017 | Gester et al. |
| 2018/0215861 A1 | 8/2018 | Fujikawa et al. |
| 2018/0250851 A1 | 9/2018 | Ogawa et al. |
| 2020/0086517 A1 | 3/2020 | Gester et al. |
| 2020/0198163 A1 | 6/2020 | Gester et al. |
| 2020/0406486 A1 | 12/2020 | Gester et al. |

FOREIGN PATENT DOCUMENTS

| | | |
|---|---|---|
| CN | 104960202 A | 10/2015 |
| DE | 10111422 A1 | 9/2002 |
| GB | 2310819 A | 9/1997 |
| JP | H0316705 A | 1/1991 |
| JP | H0699505 A | 4/1994 |
| JP | 2005267746 A | 9/2005 |
| JP | 2009241358 A | 10/2009 |
| JP | 2011007618 A | 1/2011 |
| JP | 4817554 B2 | 9/2011 |
| JP | 2014166352 A | 9/2014 |
| JP | 2015100659 A | 6/2015 |
| WO | 2008129499 A1 | 10/2008 |
| WO | 2014108538 A2 | 7/2014 |
| WO | 2015074088 A3 | 7/2015 |

(56) References Cited

OTHER PUBLICATIONS

Femtosecond Laser-Induced Document—Mar. 1, 2003/vol. 28, No. 51 Optics Letters 2PP Article.
Jaime Werkmeister et al: "AnisotropicEtching of Silicon as a Tool for CreatingInjection Molding Tooling Surfaces",Journal of Hicroelectromechanical Systems,IEEE Service Center. US,vol. 15, No. 6,Dec. 1, 2006 (Dec. 1, 2006 ), pages.
Final Office Action; U.S. Appl. No. 15/188,100 dated May 28, 2019.
Final Office Action; U.S. Appl. No. 15/188,123 dated Jun. 18, 2019.
Final Office Action; U.S. Appl. No. 15/195,157 dated May 28, 2019.
Final Office Action; U.S. Appl. No. 16/737,300 dated Sep. 9, 2021.
Non-Final Office Action; U.S. Appl. No. 15/188,100 dated Apr. 24, 2020.
Non-Final Office Action; U.S. Appl. No. 15/188,100 dated Oct. 5, 2018.
Non-Final Office Action; U.S. Appl. No. 15/188,123 dated Dec. 5, 2018.
Non-Final Office Action; U.S. Appl. No. 15/195,157 dated Sep. 14, 2018.
Non-Final Office Action; U.S. Appl. No. 15/195,137 dated Apr. 5, 2019.
Non-Final Office Action; U.S. Appl. No. 16/691,750 dated Apr. 8, 2022.
Non-Final Office Action; U.S. Appl. No. 16/737,300 dated Dec. 9, 2020.
Non-Final Office Action; U.S. Appl. No. 16/997,178 dated Mar. 24, 2022.
Notice of Allowance; U.S. Appl. No. 15/188,100 dated Feb. 22, 2021.
Notice of Allowance; U.S. Appl. No. 15/188,100 dated Jun. 1, 2021.
Notice of Allowance; U.S. Appl. No. 15/188,100 dated Dec. 30, 2019.
Notice of Allowance; U.S. Appl. No. 15/188,123 dated Aug. 27, 2019.
Notice of Allowance; U.S. Appl. No. 15/195,157 dated May 20, 2020.
Notice of Allowance; U.S. Appl. No. 15/195,137 dated Oct. 22, 2019.
Final Office Action; U.S. Appl. No. 16/691,750 dated Dec. 2, 2022.

* cited by examiner

POLYMERIC CUTTING EDGE STRUCTURES AND METHOD OF MANUFACTURING POLYMERIC CUTTING EDGE STRUCTURES

FIELD OF THE INVENTION

This invention relates to shaving razors and methods of manufacturing cutting edge structures, and more particularly to manufacturing cutting edge structures such as shaving razor blades from a polymeric material.

BACKGROUND OF THE INVENTION

Razor blades are typically formed of a suitable metallic sheet material such as stainless steel, which is slit to a desired width and heat-treated to harden the metal. The hardening operation utilizes a high temperature furnace, where the metal may be exposed to temperatures greater than about 1000° C. for up to about 20 seconds, followed by quenching, whereby the metal is rapidly cooled to obtain certain desired material properties.

After hardening, a cutting edge is formed generally by grinding the blade. The steel razor blades are mechanically sharpened to yield cutting edges that are sharp and strong to cut through hair over an extended period of time. The continuous grinding process generally limits blade shapes to have straight edges with a substantially triangular or wedge shaped profile (e.g., cross section). The cutting edge wedge-shaped configuration typically has an ultimate tip with a radius less than about 1000 Ångstroms.

The advantage of this prior art method is that it is a proven, economical process for making blades in high volume at high speed. It would be particularly desirable if such a process could utilize lower cost materials for blade formation and also enable cutting edge profiles other than substantially triangular.

Blades with cutting edges made from a polymeric material are disclosed for disposable cutlery or disposable surgical scalpels (e.g., U.S. Pat. Nos. 6,044,566, 5,782,852). Razor blades made from polymeric material are disclosed in GB2310819A. The disadvantage of any of the prior art polymer blades is that the process of making such plastic blades is not suitable to create a cutting edge with a tip radius of less than 1 μm as required for cutting hair.

Generally, the prior art utilizes melt flow processing techniques. The molten polymer of the prior art is injected into a cavity of a mold tool which is typically metal, but the polymer is generally too viscous (typically exceeding 100,000 centiPoise) to fully penetrate into the sub-micro-meter (e.g., less than 1 micrometer) dimensioned spaces required in a cavity to create razor blade edges. However, choosing a lower viscosity material or increasing the injection pressure, which may benefit penetration into sub-micro-meter dimensioned spaces, causes the polymeric material to penetrate between the mating surfaces of the two halves of the mould tool, known as "flashing," and therefore the required cutting edge tip radius cannot be achieved. A decrease of viscosity of the polymeric material may also be obtained by heating the polymeric raw material above the glass transition temperature, often exceeding 200° C. Furthermore, after filling the cavity, the fluid polymeric material needs to be cooled to achieve a solid state, which causes shrinkage of the blade shape and rounding of the edge and therefore the required cutting edge tip radius cannot be achieved.

Therefore, a need exists for better processes for cutting edge structures made of polymer and more cost-effective methods of making cutting edge structures for shaving razors having required tip radius, less variability in edge quality and sharpness to provide a comparable or improved shaving experience.

It is also desirable to find materials and processes that can form cutting edge structures having any shape, such as non-linear edges and/or provide an integrated assembly.

SUMMARY OF THE INVENTION

The present invention provides a simple, efficient method for manufacturing one or more cutting edge structures, such as razor blades from a polymeric material and a functional polymeric cutting edge structure such as a razor blade. Moreover, some methods are suitable for producing a plurality of such cutting edge structures, or "blade boxes" comprising a plurality of razor blades formed in a polymeric material to be disposed as a single unit in a razor cartridge.

In one aspect, the method for manufacturing at least one cutting edge structure includes providing a base structure of a first polymeric material, pressing at least one cutting edge template into the base structure, removing the template to obtain a cavity in the base structure, filling the cavity with a second material, the second material being a precursor for a polymeric material, curing the second material, and separating the base structure and the cured second polymeric material, the at least one cutting edge structure comprised of the cured second polymeric material. In one aspect of the invention, the second precursor material includes a monomer material, an oligomer material, or any combination thereof. The at least one cutting edge structure can include a gothic arch, a roman arch, or one or more undercuts and have a tip radius of less than 1 micrometer.

In another aspect of the present invention, the first polymeric material includes Poly (methyl methacrylate) (PMMA) or Polydimethylsiloxane (PDMS) and the second precursor material includes acrylic or epoxy based materials. The viscosity of the second precursor material is less than about 10000 centiPoise.

In another aspect of the present invention, the base structure is only one part and the cavity is entirely comprised in a single part in the base structure. A portion of the cavity is not enclosed by the base structure after formation.

Further, at least one of the second precursor material, the cured second polymeric material and at least one side of the cavity is transparent to electro-magnetic radiation at a wavelength in the range of 250 to 1500 nanometers.

Additionally, the separating step of the present invention includes physical or chemical removal of the base structure from the cured second polymeric material cutting edge structure. The first polymeric material is compliant. The separated base structure may be reused at the filling step.

In another aspect of the present invention, a photo-initiator of about 1 to about 3% by weight of composition is added to the second precursor material prior to the curing step.

The present invention step of curing includes cross-linking or polymerization and the curing is mediated via heat, light, such as UV light, or a combination thereof.

In still yet another aspect of the invention, the at least one cutting edge structure formed using the method herein is a razor blade or a portion of a blade box and the razor blade or the blade box is secured into a razor cartridge housing or frame.

Another embodiment of the present invention is a razor blade including at least one cutting edge structure comprised of a polymeric material, the polymeric material produced by a precursor material for the polymeric material. A still further embodiment is a blade box including at least one cutting edge structure where the at least one non-cutting edge structure is coupled to the at least one cutting edge structure, and both the cutting and non-cutting edge structures are made of a polymeric material, the polymeric material produced by a precursor material for the polymeric material.

The details of one or more embodiments of the invention are set forth in the accompanying drawings and the description below. Other features, objects, and advantages of the invention will be apparent from the description and drawings, and from the claims.

DETAILED DESCRIPTION OF THE DRAWINGS

DETAILED DESCRIPTION OF THE INVENTION

The methods of the present disclosure provide for the manufacture of cutting edge structures (e.g., razor blades which may be used in shaving devices or razors). Specifically, disclosed are methods for manufacturing cutting edges or razor blades for shaving devices from polymeric material.

As used herein, a polymeric material signifies a material that is formed of a polymer, the latter being a large, chain-like molecule made up of monomers, which are small molecules. Generally, a polymer can be naturally occurring or synthetic. In the present invention, preferred embodiments comprise synthetic or semi-synthetic polymers. The synthetic or semi-synthetic polymer materials generally can occur in two forms or states. The first state may be a soft or fluid state and the second state may be a hard or solid state. Generally synthetic polymers are molded or extruded when in the first state (e.g., liquid or soft) and subsequently formed into an object that is in a second state (e.g., hard or solid). In some instances, the material is reversible (e.g., a material in the second state can be converted back to its first state) while in others, the polymerization is irreversible (e.g., the material cannot be converted back to its first state).

A thermoplastic polymer is a type of reversible polymer that is in a soft or liquid first state at elevated temperatures (e.g. 200° C. and above) and converts to a solid second state when cooled to ambient temperatures. Thermoplastic polymers are typically used for injection molding or extrusion techniques of the prior art.

For those polymeric materials where the second state is obtained from the first state via irreversible polymerization, the first state of the polymeric material may generally be thought of as being a "precursor" for the second state of the polymeric material. As such, in the present invention, a polymeric material may be generated from a precursor material or a material in a first state.

The materials that are generally desired for the present invention cutting edge structures are materials in the first, soft or liquid, states which comprise monomers or short chain length (e.g., or low molecular weight) polymers known as oligomers or both. Both monomers and oligomers are referred to herein as "precursors." These precursors are converted into long chain length polymeric material in the second, solid state through a polymerization or cross-linking process, herein referred to as a curing process. Curing the precursor material can generally be achieved under the influence of heat, light, ionic or high energy radiation, or any combination thereof. After curing, the solid polymeric material is achieved.

Figure 1:
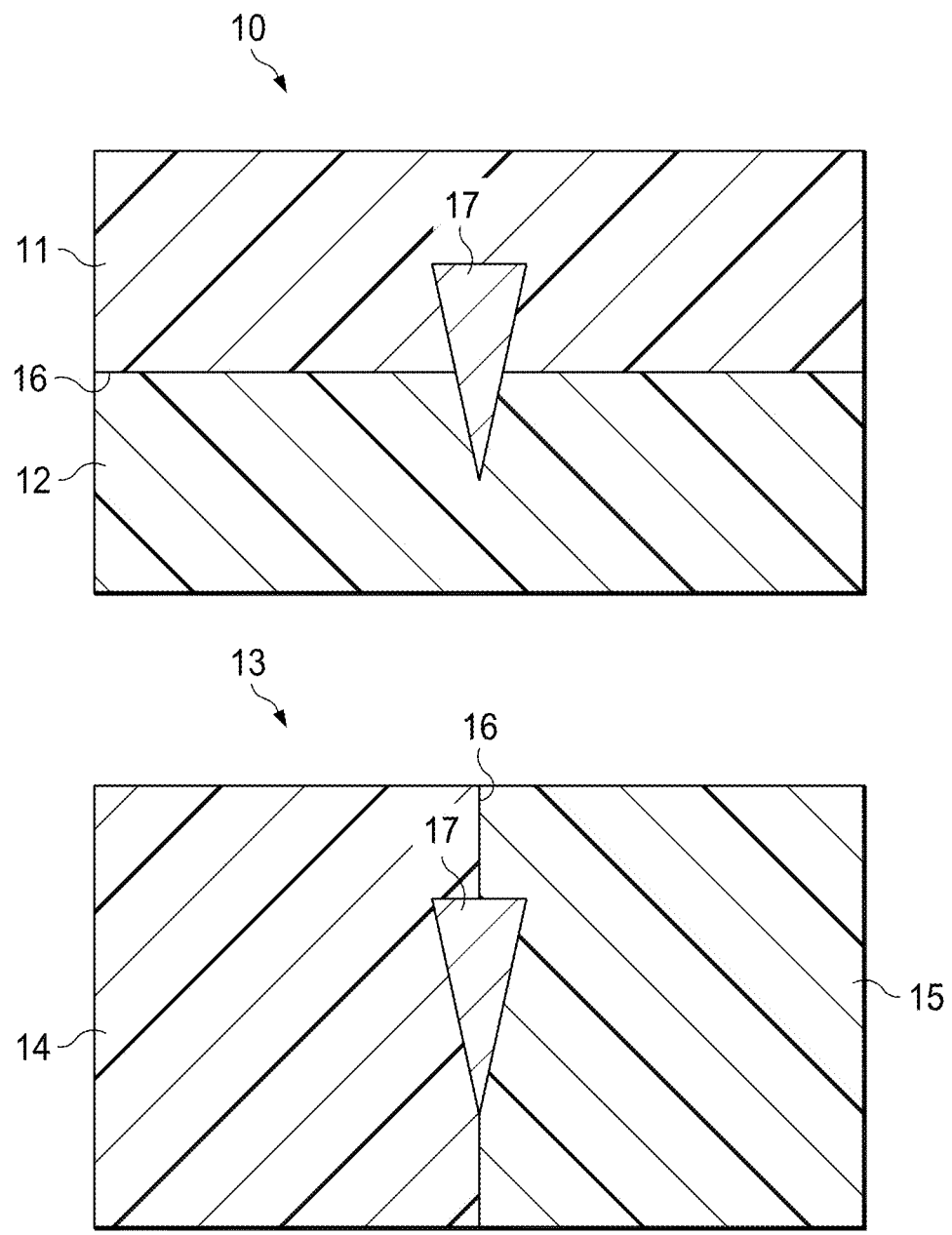
FIG. 1 depicts cross-sectional views of base structures of the prior art.

FIG. 1 depicts cross-sectional views of base structures of the prior art. In one prior art embodiment, a base structure 10 is shown having two parts, an upper portion 11 and a lower portion 12, while in another prior art embodiment, a base structure 13 is shown having a left portion 14 and a right portion 15. Between the mating surfaces or interface 16 of each prior art base structure is where a cutting edge structure 17 may be formed. It should be noted that the base structure material of the prior art is generally machined out of metal. In both base structures 10 and 13, in order for the cutting edge structure 17 to be formed, both portions of each base structure, respectively, have to be present in the base structure and have to be joined firmly together. The base structure is, in effect, a closed system only having one or more small fluid channels for the liquid polymer to be injected. Further, in both base structures 10 and 13, after injecting and solidifying the polymer, the base structure has to be opened or split apart in order to remove the cutting edge structure 17.

Figure 2:
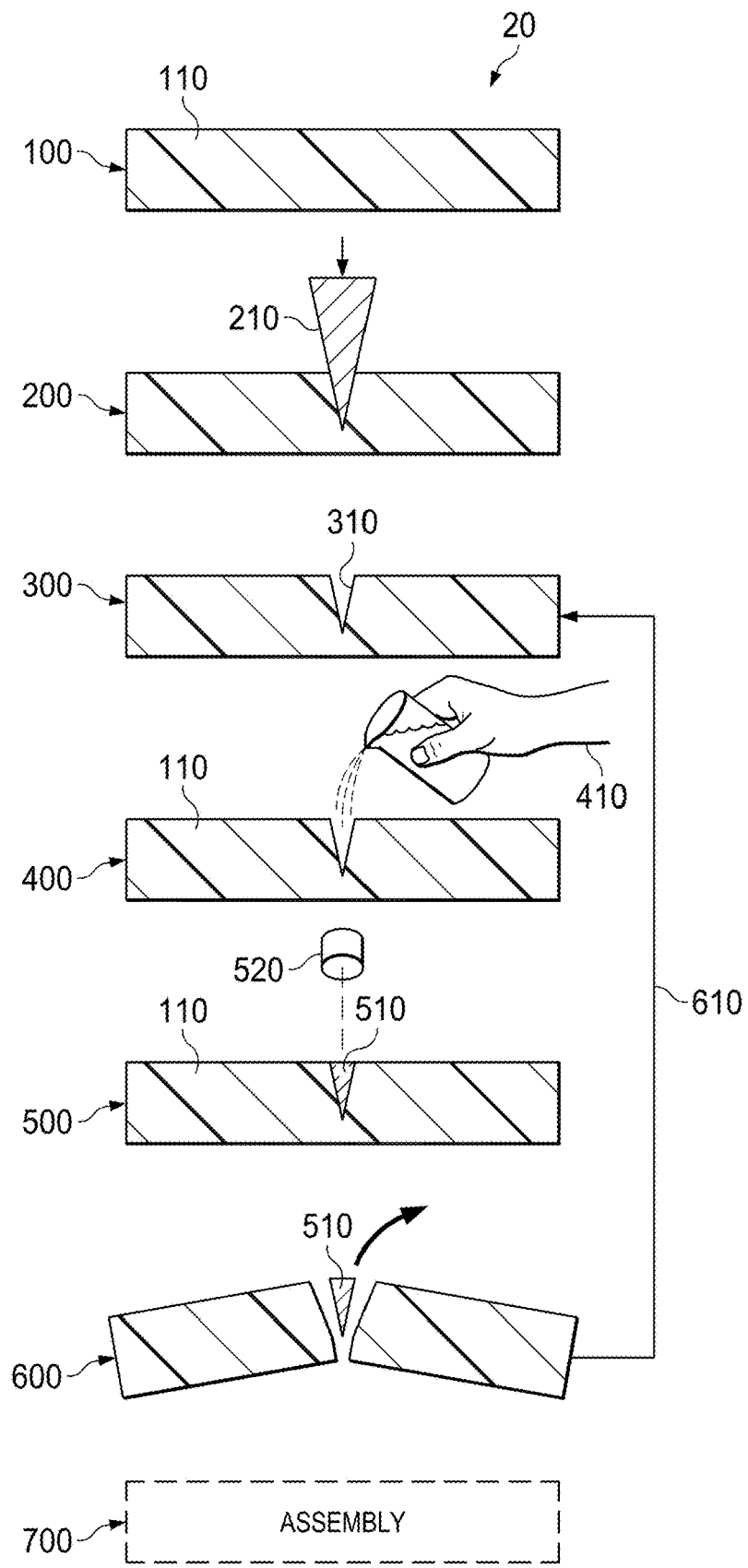
FIG. 2 is a flow diagram of a method of manufacturing razor blades from polymer, according to a preferred embodiment of the present invention.

In FIG. 2, a flow diagram 20 of a method of manufacturing razor blades from one or more polymeric materials according to a preferred embodiment of the present invention is illustrated.

A first polymeric material is preferably selected to produce a base structure 110 in which to form the razor blades, as shown in step 100. There is generally no limitation to the types of first polymeric materials that can be used to form the base structure 110. In a preferred embodiment, the first polymeric material and related precursors are Poly (methyl methacrylate) (PMMA), Polydimethylsiloxane (PDMS), or other materials commonly used for micro-replication or nano-imprint lithography, and as such, the base structure 110 of step 100 is preferably comprised of SYLGARD® 184 from Dow Corning. The viscosity of SYLGARD® is about 5100 centiPoise.

A thermoplastic polymer may be utilized in the present invention for forming the base structure, particularly if the melting of the base structure is desired as described below at step 600 in FIG. 2.

There is also no limitation with respect to the dimensions of the base structure (e.g., height, length) though desirably the base structure may have a height of at least about 5 mm and a length of at least about 30 mm.

It should be noted that the base structure 110 can be considered to be a portion of a mold that will form the cutting edge structure (e.g., razor blade). In the flow diagram 10 of the present invention, the base structure 110 effectively represents a single part mold which cannot generally be split into further parts. The base structure 110 can be considered to be a half of a typical mold (e.g., the bottom half) since the other (e.g., upper) half is not a component of the present invention. This contrasts the base structures of the prior art shown in FIG. 1 by having only a single part mold or one half of a mold, the issues of "flashing" found in two part molds found in the prior art melt flow processing are avoided.

Figure 3:
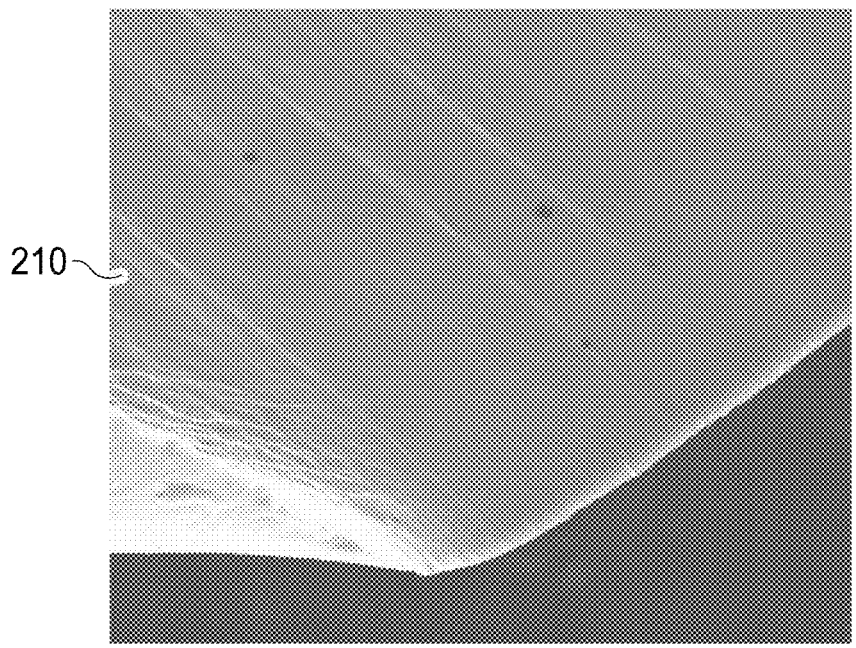
FIG. 3 is a micrograph of a steel blade used as a cutting edge template in FIG. 2 according to the present invention.
Figure 10:
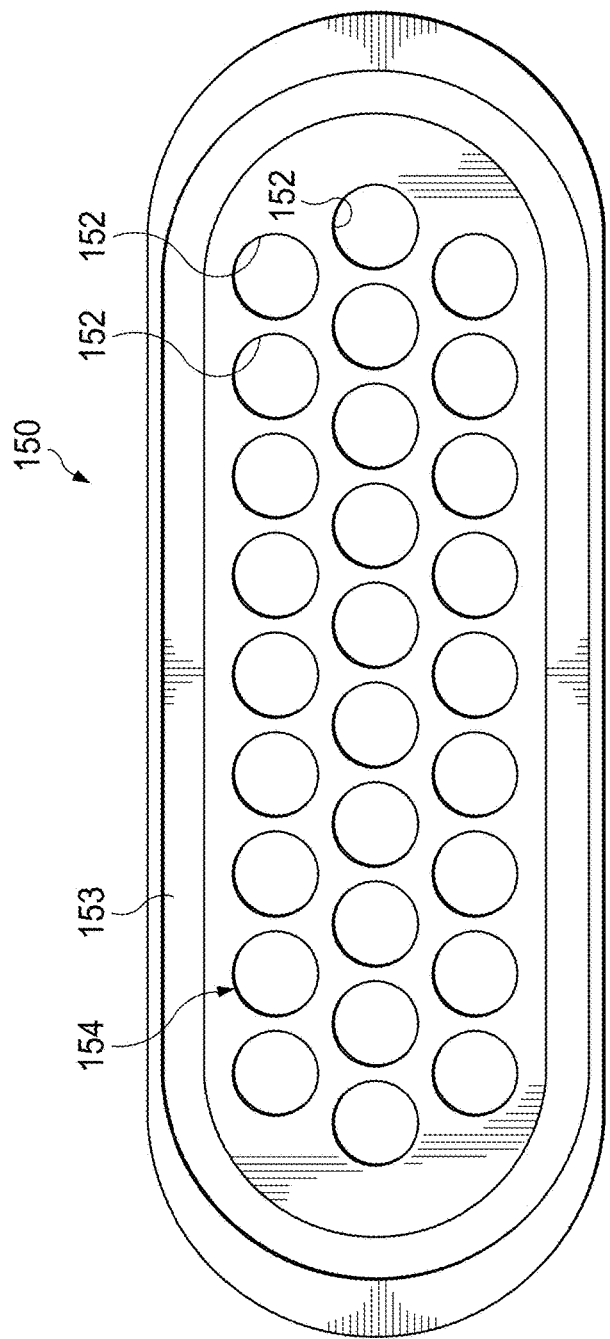
FIG. 10 is a perspective view of a structure having a plurality of non-linear cutting edges formed therein according to a still further embodiment of the present invention.
Figure 11:
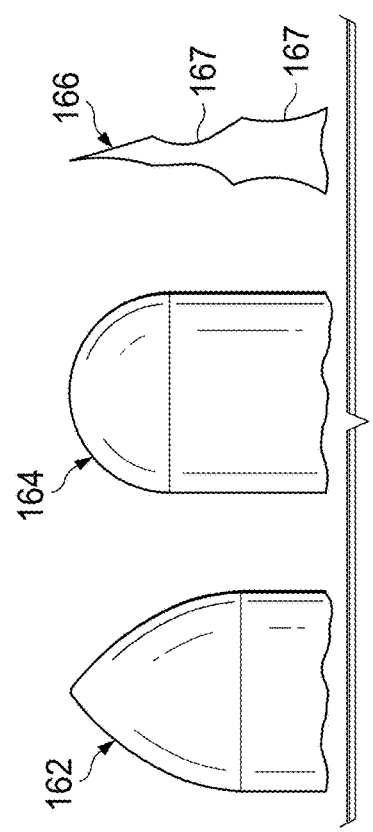
FIG. 11 depicts various profiles of present invention cutting edge structures.

A cutting edge template 210 is pressed into the base structure 110 at step 200. The cutting edge template 210 may be of any type desired, but is generally preferably a three-dimensional stainless steel blade of the type shown in FIG. 3. The cutting edge template 210 may also be comprised of silicon, sapphire or diamond. The template 210, regardless of material composition, may have any shape or profile feasible for a cutting edge. For instance, the shape of the template, and in turn, the final cutting edge structure shape, may be straight, curved, ellipsoidal, notched or toothed, or with internal openings including as many bevels and facets as desired to be present in the resultant polymeric blade. Several shapes formed in the present invention are shown in FIGS. 10 and 11.

Figure 4:
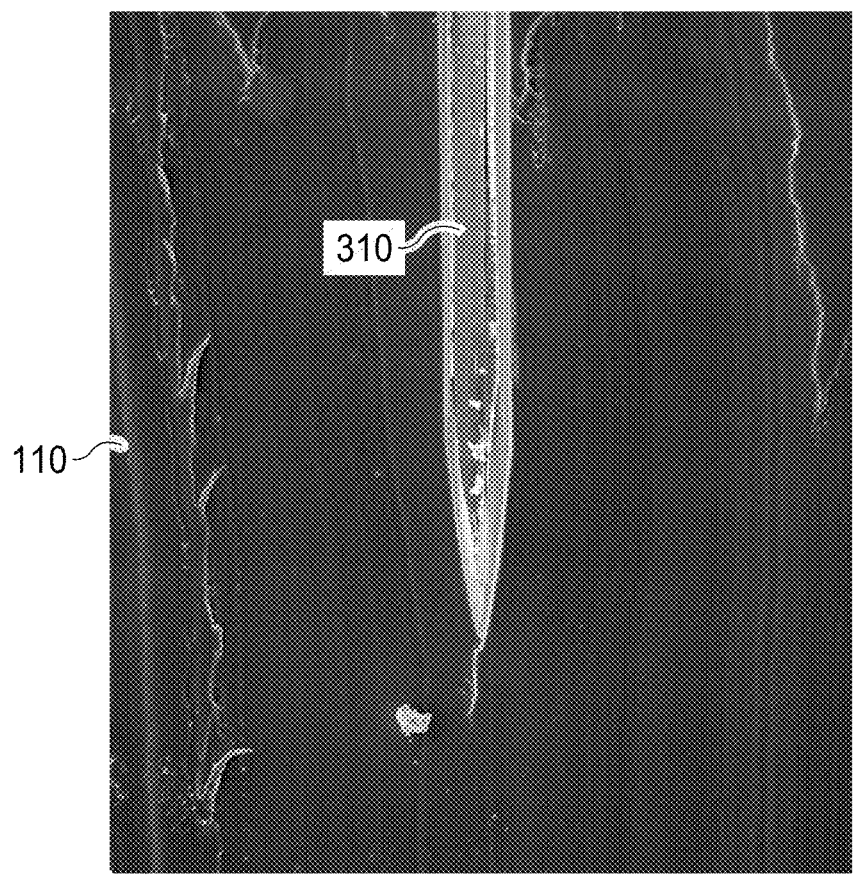
FIG. 4 is a micrograph of a cross-sectional view of a cavity according to the present invention.

At step 300, the cutting edge template 210 is removed, revealing a cavity 310 in the base structure 110. The cavity has the shape of the razor blade with desired tip radius (e.g., less than 1 μm). A micrograph of a cross-sectional view of a cavity 310 as formed in step 300 using a PDMS base structure of the present invention is shown in FIG. 4.

It should be noted that, as shown in FIG. 2, the cavity is a single part created by replication of a template of a cutting edge. As noted above, by comprising only a single part mold or one half of a mold, the issues of "flashing" found at the interface of two part molds in the prior art melt flow processing are avoided.

As shown in step 400, the cavity 310 formed in the base structure 110 made from a first polymeric material is filled with a second polymeric material 410, preferably in a form of a precursor for the second polymer. A precursor in the present invention may preferably be a monomer or a low molecular weight oligomer material.

Desirably the filling or pouring step 400 of the present invention occurs at ambient temperature ranging from about 10 degrees Celsius to about 40 degrees Celsius or may be heated up to 100 degrees Celsius to further reduce its viscosity. While generally there is no limitation to the types of second polymeric materials that can be used to fill the cavity, it is desirable that the polymeric precursor be more fluid and less viscous at ambient or near ambient temperatures than polymeric materials used in melt flow processing in order to achieve full penetration of the material in the cavity 310 and to fill the cavity 310 with a shape of a razor blade and tip desired. As such, a preferred viscosity of the second polymeric material precursor of the present invention is less than about 10000 centiPoise, more preferably less than about 5000 centiPoise, and most preferably about 3000 centiPoise or less. In the present invention, the second polymeric material is preferably an acrylic based material, more preferably a polymer with monomer or oligomer formulations such as Femtobond 4B, and most preferably polymeric materials from the ORMOCER® family, such as ORMOCORE, supplied by Microresist Technology GmbH. The ORMOCORE material has a viscosity of about 2900 centiPoise at ambient temperature. Another material named E-shell 300 which may be used as a precursor has a viscosity of about 340 centiPoise. The precursor material has a viscosity that is lower than the viscosity of the base structure or first polymeric material. It is noted in the present invention that a non-polymerized material, such as Ormocore, may be heated, up to 100 degrees Celsius to further reduce the viscosity. Generally, heating above 100 degrees Celsius may undesirably result in shrinkage when cooling down the cured structure.

Alternative, epoxy based materials such as SU8 supplied by MicroChem with a range of viscosities from 2.5 to 1250 centiPoise can be utilized as the second polymeric material.

A photo-initiator of about 1 to about 3% by weight of composition may be added to the second polymeric material prior to the curing step 500 in FIG. 2. Photo-initiators generally start the polymerization or cross-linking (e.g., curing) process of the precursor of a polymeric material by absorbing radiation, commonly visible or UV light, and creating radicals that react with the monomers or oligomers and link them together. A photo-initiator commonly used with acrylate based precursors is alpha hydroxy ketone, sold under the trade name of IRACURE® 184 by BASF. In the case of Ormocore, a photo-initiator may be IRACURE® 369 also by BASF.

The curing of the second polymeric material 410 to create a solid polymer is performed at step 500 in FIG. 2. The curing process may be achieved by heat or light 520 though more preferably the curing process of the present invention is light. The temperature for curing may be any temperature, including preferably ambient or room temperature. Desirably the curing process of the present invention occurs at ambient temperature ranging from about 10 degrees Celsius to about 40 degrees Celsius or may be heated up to 100 degrees Celsius to further reduce its viscosity. Generally, the higher the temperature applied, the faster the curing or hardening of the material occurs. Curing of the precursor (e.g., the monomer or oligomer to create a solid polymer) may involve polymerization, i.e., molecular chain formation or cross-linking of existing molecular chains or both. Curing of the present invention is carried out preferably by exposing the precursor or second polymeric material 410 to electromagnetic radiation, e.g., UV light. The wavelength of the electromagnetic radiation may range from about 250 to about 1500 nanometers, preferably from about 400 nanometers to about 1100 nanometers. If a photo-initiator is used, the polymeric material is transparent at a specific wavelength in this range, optimally chosen for the used photo-initiator. Hence, the precursor and the cured solid polymer of the present invention and/or at least one side of the cavity generally need to be at least partially transparent for the wavelength of the electromagnetic radiation to be effective. The transparency selection of the polymer is necessary for effectiveness as curing or polymerization of the whole object (e.g., cutting edge structure) generally cannot occur when using light if the light cannot penetrate below the surface of the polymer. While light curing is preferred to avoid shrinkage, heat may also produce generally about the same results as those with light.

This step avoids expansion, shrinkage or distortion of the material and forms a cutting edge structure 510 from the second polymeric material 410.

At step 600, the base structure 110 is removed from the cutting edge structure 510. The base structure can be removed by physical or chemical means. A physical removal may include bending the base structure 110 apart and away from the cutting edge structure 510. In some cases, the base structure 110 may have a rubbery attribute making a physical removal feasible. A chemical removal process may include dissolving the base structure 110. The type of chemistry for dissolving the base structure may include organic solvents and if made from PMMA may include solvents such as acetone, acetonitrile, 1,2-dichloroethane, and dichlorobenzene, and if made from PDMA, may include solvents such as solution of TBAF (tetrabutylammonium fluoride) in NMP (N-Methylpyrrolidinone) or in DMF (dimethylformamide) or in THF (tetrahydrofuran) or in PMA (propylene glycol methyl ether acetate) or any combination thereof.

The removal process may be achieved by dissolving, wet etching (e.g., via a chemical solution), melting, or any combination thereof.

The cutting edge structure 510 represents the structure in the shape of a final cutting edge or razor blade edge.

It should be noted that in a preferred embodiment, the first polymeric material and related precursors that form the base structure 110 are Poly (methyl methacrylate) (PMMA) or Polydimethylsiloxane (PDMS). The material to form the base structure is preferably compliant, signifying that the material is flexible or deformable, so that the replicated cutting structure 510 formed from the second material, such as ORMOCORE or Femtobond 4B or SUB, can be easily removed from the base structure 110 after curing. With a PDMS-formed base structure 110, the elasticity and low surface energy properties of the PDMS material allow desirable removal of the cutting edge template 210. The elasticity provides deformation of the base structure 110 to release the cutting edge template 210 while also allowing the base structure 110 to return to its original shape after the cutting edge template 210 is removed. The low surface energy of the PDMS material prevents sticking of the cutting edge template 210 to the base structure 110 and also prevents damage to the base structure 110 during removal. Having these two properties, the base structure material plays an advantageous role in assisting the removal of the cutting edge template and cutting edge structure.

Flashing has been avoided with the present invention process since the base structure of the present invention is capable of forming the polymeric blade within one portion of the base structure as the base structure is formed of one part as opposed to the two mating parts or halves of the prior art (FIG. 1).

Figure 5:
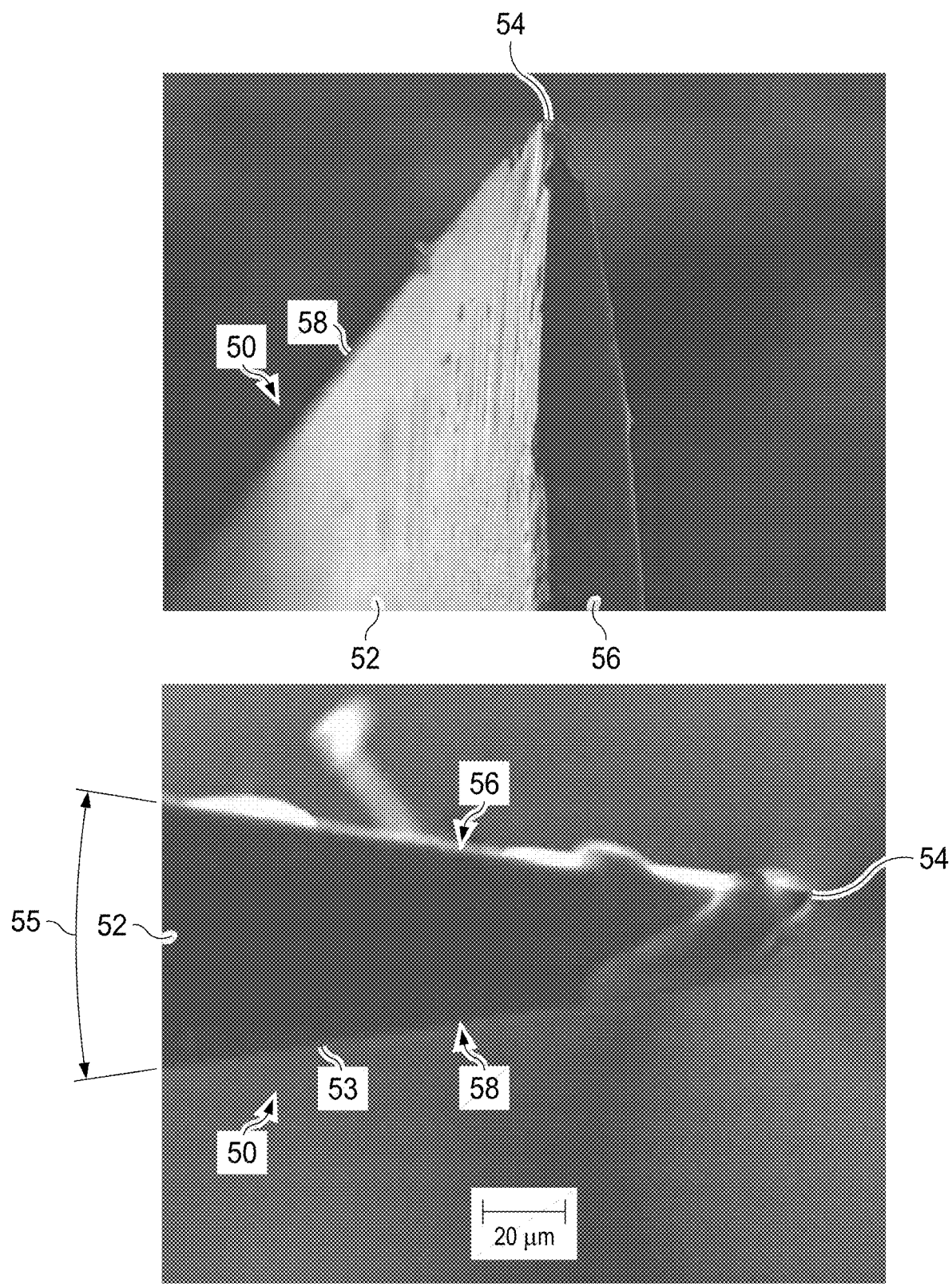
FIG. 5 is a micrograph of a replicated blade made with the process of FIG. 2.

In FIG. 5 micrograph views are shown of actual released cutting edge structures manufactured in accordance with the methods of manufacturing described herein. The replicated cutting edge structure or blade edge is made from ORMOCORE (the second polymeric material) removed from a PDMS (the first polymeric material base structure) mold using the process of FIG. 2.

The tip radius of the cutting edge structure produced by the present invention process is desirably in the range of less than about 1 micrometer. The hardness of a polymeric cutting edge structure formed, such as with ORMOCER®, may reach near 100 MPa after curing. In the case of SU8, the cutting edge structure may be pyrolised after removing it from the base structure in step 800 of FIG. 2, to further increase the hardness. As polymerized SU8 has a hardness of about 180 MPa and pyrolised SU8 has a hardness of about 1 GPa.

As shown in FIG. 5, the razor blade 50 includes a polymeric body portion or substrate 52 with a wedge-shaped sharp edge having a tip 54. The tip 54 has a blade edge 53 having about a 15 degree included blade angle 55, as shown in FIG. 5. Facets 56 and 58 diverge from the tip 54.

While a conventional razor blade wedge profile is shown in FIG. 5, the present invention contemplates cutting edge structures with any number of facets, e.g., more than 2 or 3, and these facets need not be planar. Several exemplary shapes of the present invention are shown below in FIGS. 10 and 11 though any desirable, feasible shape is contemplated in the present invention.

It should be noted that the base structure 110 of FIG. 2, if not dissolved or melted at step 600 to remove the cutting edge structure, may be used over again to form additional cutting edge structures. The number of times the base structure may be used may be limited depending on the type of first polymeric material utilized for the base structure and the robustness of the base structure after each use. Arrow 610 which returns back to step 300 of FIG. 2 depicts the re-use of the base structure.

Once free from the base structure, each cutting edge structure that is produced can generally be assembled individually into a razor cartridge. For example, one or more polymer razor blades may be adhered to blade supports (e.g., with glue, ultrasonic welding) and assembled into razor cartridge housings. Once removed from the base structure, the blades can then be processed or coated if necessary and assembled into a razor cartridge at step 700 of FIG. 2.

Figure 6:
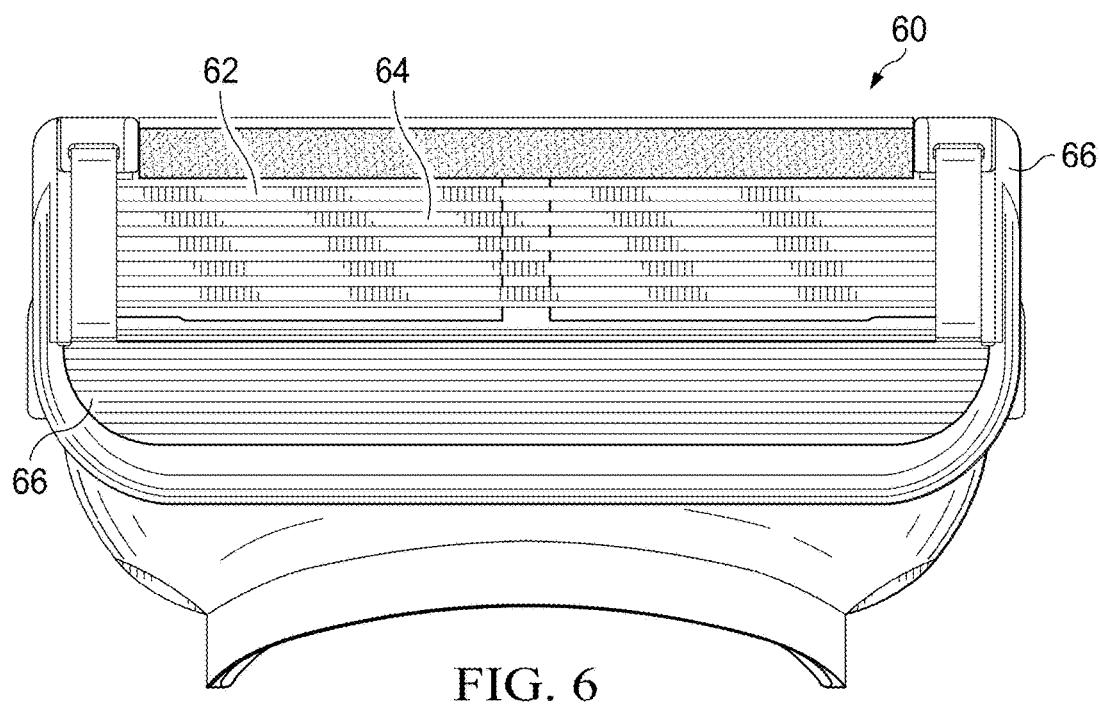
FIG. 6 is a front view of a razor cartridge having polymer razor blades made with the process of FIG. 2, according to one embodiment of the present invention.

A razor cartridge 60 having one or more cutting edge structures or razor blades 62 made of polymer 64 of the present invention can be assembled as shown in FIG. 6. Razor cartridge 60 is similar to razor cartridges that are commercially available utilizing steel blades and with plastic housing and frame components 66. In assembly step 700, the polymeric razor blades 62 can be secured to a mounting assembly prior to being inserted into the frame 66 or housing or they may be mounted directly on the frame.

While the methods of manufacturing described herein have been referred to with primary reference to a single cutting edge structure (e.g., razor blade), the methods are easily applicable to the manufacture of multiple cutting edge structures simultaneously.

Figure 7:
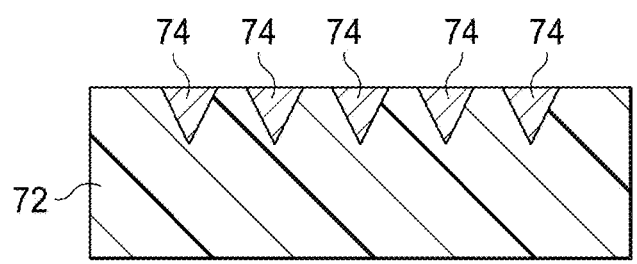
FIG. 7 is a cross-sectional view of an alternate embodiment of the present invention depicting five cavities in a base structure.

In FIG. 7, a base structure 72 having a plurality of cavities 74 (e.g., five cavities) produced in accordance with the methods described herein is illustrated. Manufacture of the plurality of cutting edge structure (e.g., razor blades) follows the process of FIG. 2 but includes one or more cutting edge templates (not shown) being pressed into the base structure at the same time (if more than one) or in sequence (if only one). After such a "batch" manufacture of the plurality of cutting edge structures such as razor blades on the base structure, the cutting edge structures may be separated as described above in conjunction with FIG. 2 in preparation for further assembly into razor cartridges. It should be noted that the base structure 72 size, depending on the size of the cutting edge structures desired, may be larger than the base structure 110 of FIG. 2.

Figure 8:
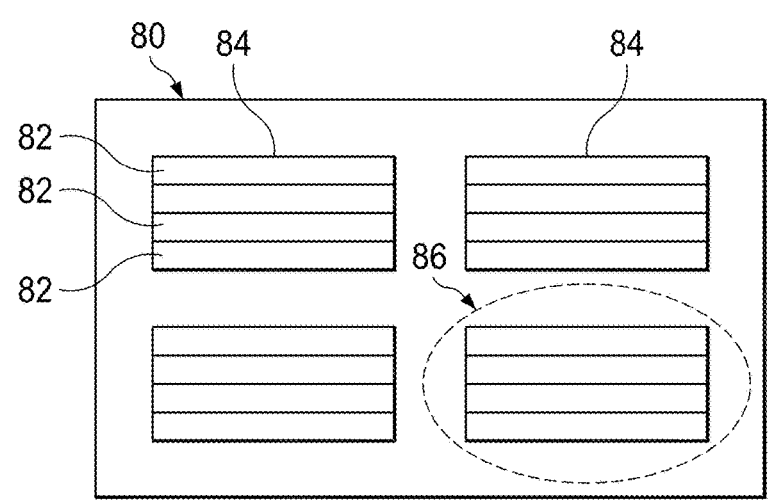
FIG. 8 is a top view of a plurality of blade boxes in a base structure, each having a plurality of blades and a frame in another embodiment of the present invention.
Figure 9:
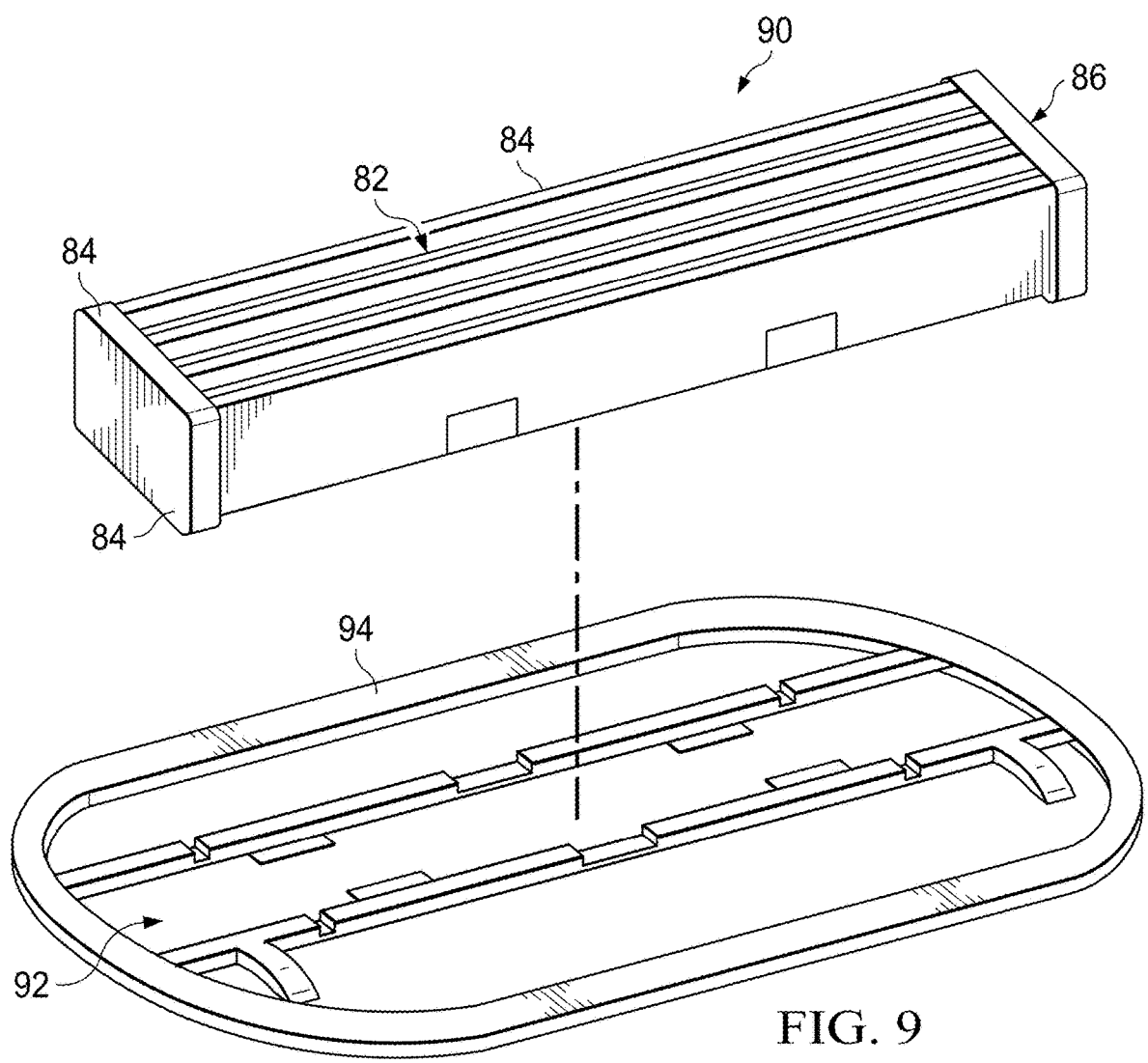
FIG. 9 is a top view of a blade box for insertion into a razor cartridge of the present invention.

Turning to FIG. 8, a plurality of razor blades 82 may be formed clustered together in groups of four blades with a small frame 84. The frame is a non-cutting edge structure while the razor blades are cutting edge structures. The clusters have a generally rectangular shape and for ease in discussion are referred to herein as blade boxes 86. The plurality of razor blades 82 can be manufactured in this clustered organization to reduce downstream process steps in the shaving razor system assembly. The blade boxes 86 have 4 individual razor blades 82, as illustrated, enclosed by a frame 84. The blade boxes 86 can be manufactured identically or they can be different, such as each box having differences in blade spacing, included blade angles, number of blades, orientation of the blades, and the like. The differences can be made via changes to the various method steps described above, such as utilizing different templates and pressing in different orientations, and the like. A blade box 86 can be removed from the base structure in the same manner as described above, but such that the self-contained blade box 86 is a singular unitary part. In FIG. 9, a blade box 86 is inserted into an opening 92 in the housing 94 of a razor cartridge 90 and secured therein or be formed into a razor cartridge entirely at the outset (not shown).

Assembling the razor cartridge in such a manner eliminates the somewhat time consuming or difficult steps of affixing each individual razor blade to a blade support or to a housing, inserting each blade support-razor blade pair or each blade in the razor cartridge housing, and aligning each separate razor blade to the desired blade height, angle, and spacing. By utilizing the method described herein, the plurality of razor blades are aligned and secured in the blade box, thereby eliminating the need to affix individual blade supports and the difficult process of aligning 3 or more separate razor blades into the razor cartridge housing. While FIG. 8 and FIG. 9 illustrates blade boxes 86 having 4 razor blades, it is to be understood that any number of razor blades can be clustered together, such as 2, 3, 5, or more.

While the blades illustrated in the figures thus far have generally linear blade edges, other blade shapes and edge patterns can be produced by the methods described herein.

To that end, in a still further alternative embodiment, different cutting structures in addition to straight edged or wedge-shaped configuration for blade edges are also contemplated in the present invention.

These other shapes are produced by using a cutting edge template in step 200 that comprises a different profile. In some instances, a sheet of material or a frame 153 with openings 154 that contain internal cutting edges 152 that are non-linear as shown in the blade box 150 of FIG. 10 is used. In this embodiment of the present invention, the sheet 153 may be pressed into the base structure preferably using the process of FIG. 2.

Any number of shapes or profiles for the cutting edge template, and hence, for the cutting edge structure or structures that will be formed, is contemplated in the present invention. The present invention includes, but is not limited to, the additional illustrative embodiments depicted in FIG. 11. Two arched cutting edge profiles, e.g., a gothic arch profile 162, a roman arch profile 164 are shown in FIG. 11 though any other feasible shape of the cutting edge structure is encompassed by the present invention (e.g., wavy, serrations, saw teeth, etc.). Additionally, a cutting edge profile 166 having one or more undercuts 167 is also shown in FIG. 11.

One of the many advantages of producing razor blades for shaving from polymer in the manner described herein is that resultant cutting edge structures or blade edges formed have very similar surface roughness as the template cutting edge. Thus, when replicating a steel blade, grind marks of the steel template cutting edge are also replicated. Very smooth facet surfaces without grinding marks can be created, if the template is produced from single crystal material such as silicon or sapphire. Accordingly, the resultant cutting edge structure has a similar surface roughness to that of the template cutting edge. A change in the template cutting edge material would change the surface roughness of the resultant cutting edge.

Accordingly, other embodiments are within the scope of the following claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blade box comprising
   at least one razor blade comprising at least one cutting edge structure;
   at least one non-cutting edge structure coupled to each of said at least one cutting edge structure, both said cutting and non-cutting edge structures comprised of a polymeric material, said polymeric material produced by a precursor material for said polymeric material.

2. A razor blade comprising
   at least one cutting edge structure comprised of a polymeric material, said polymeric material produced by a precursor material for said polymeric material.

3. The razor blade of claim 2 wherein said precursor material is comprised of a monomer material, an oligomer material, or any combination thereof.

4. The razor blade of claim 2 wherein said precursor material is comprised of an acrylic based material or an epoxy based material.

5. The razor blade of claim 2 wherein said polymeric material is cured by cross-linking or polymerization.

6. The razor blade of claim 2 wherein said polymeric material is cured by heat, light, or a combination thereof.

7. The razor blade of claim 2 wherein a viscosity of said precursor material is less than about 10,000 centiPoise.

8. The razor blade of claim 2 wherein said at least one cutting edge structure is formed within a cavity.

9. The razor blade of claim 8 wherein the cavity is entirely comprised in a single part in a base structure.

10. The razor blade of claim 6 wherein at least one of said precursor material, said polymeric material and at least one side of the cavity is transparent to electro-magnetic radiation at a wavelength in the range of 250 to 1500 nanometers.

11. The razor blade of claim 2 wherein a photo-initiator of about 1 to about 3% by weight of composition is added to said precursor prior to curing said precursor.

12. The razor blade of claim 2 wherein said polymeric material is comprised of Poly (methyl methacrylate) (PMMA) or Polydimethylsiloxane (PDMS).

13. The razor blade of claim 2 wherein said at least one cutting edge structure comprises a gothic arch, a roman arch, or one or more undercuts.

14. The razor blade of claim 2 wherein a tip radius of said at least one cutting edge structure is less than 1 micrometer.

15. The razor blade of claim 2 wherein said at least one cutting edge structure is secured into a blade box or into a razor cartridge housing, or frame.

16. The razor blade box of claim 1 wherein said blade box is comprised of different types of cutting edge structures.

17. The razor blade box of claim 1 wherein said blade box is secured into a razor cartridge housing or frame.

18. A blade box cluster comprising
   a plurality of blade boxes, each of said plurality of blade boxes comprising
      at least two razor blades, each comprising at least one cutting edge structure;
      at least one non-cutting edge structure,
   wherein said at least two cutting edge structures comprised of a polymeric material, said polymeric material produced by a precursor material for said polymeric material.

19. The blade box cluster of claim 18 wherein said at least one non-cutting edge structure comprises a frame.

20. The blade box cluster of claim 18 wherein said at least one non-cutting edge structure is comprised of a polymeric material, said polymeric material produced by a precursor material for said polymeric material.

21. The blade box cluster of claim 18 wherein each of said plurality of blade boxes is an integral unit.

22. The blade box cluster of claim 18 wherein each of said plurality of blade boxes is removable from said blade box cluster.

23. The blade box cluster of claim 18 wherein one of said plurality of blade boxes is different than another one of said plurality of blade boxes.

24. The blade box cluster of claim 18 wherein each of said plurality of blade boxes is comprised of different types of razor blades having different types of cutting edge structures.

25. The blade box cluster of claim 18 wherein said each of said plurality of blade boxes is secured into a razor cartridge housing.

* * * * *